United States Patent [19]
Faivre

[11] 3,977,656

[45] Aug. 31, 1976

[54] DOMESTIC ELECTRIC ICE-CREAM FREEZER

[75] Inventor: André Faivre, Dijon, France

[73] Assignee: Seb S.A., Selongey, France

[22] Filed: Mar. 14, 1975

[21] Appl. No.: 558,454

[30] Foreign Application Priority Data
May 2, 1974  Luxemburg............................ 69979

[52] U.S. Cl............................ 259/108; 259/DIG. 33
[51] Int. Cl.[2] ............................................ B01F 7/18
[58] Field of Search............ 259/107, 108, DIG. 32, 259/DIG. 33, DIG. 34, 121, 119, 122

[56] References Cited
UNITED STATES PATENTS

| | | | |
|---|---|---|---|
| 2,054,724 | 9/1936 | Fulton.......................... | 259/DIG. 33 |
| 2,817,502 | 12/1957 | Yohe ................................. | 259/108 |
| 2,850,268 | 9/1958 | Miller ................................. | 259/108 |

*Primary Examiner*—Robert W. Jenkins
*Attorney, Agent, or Firm*—Young & Thompson

[57] ABSTRACT

A freezer for use in a refrigerated enclosure comprises a cylindrical vessel and a reduction-gear motor unit which is removably secured to the vessel and drives a mixing paddle. In the operating position, the reduction-gear motor unit rests on part of the edge of the vessel, the portion of the unit which contains the motor is supported on the external face of the vessel side-wall and the portion containing the reduction-gear system extends above the vessel and is supported on the internal face of the side wall. Two opposite ends of the reduction-gear unit comprise two coaxial cylindrical portions having a radius which corresponds to that of the vessel and the height of the unit corresponds to the depth of the vessel.

4 Claims, 5 Drawing Figures

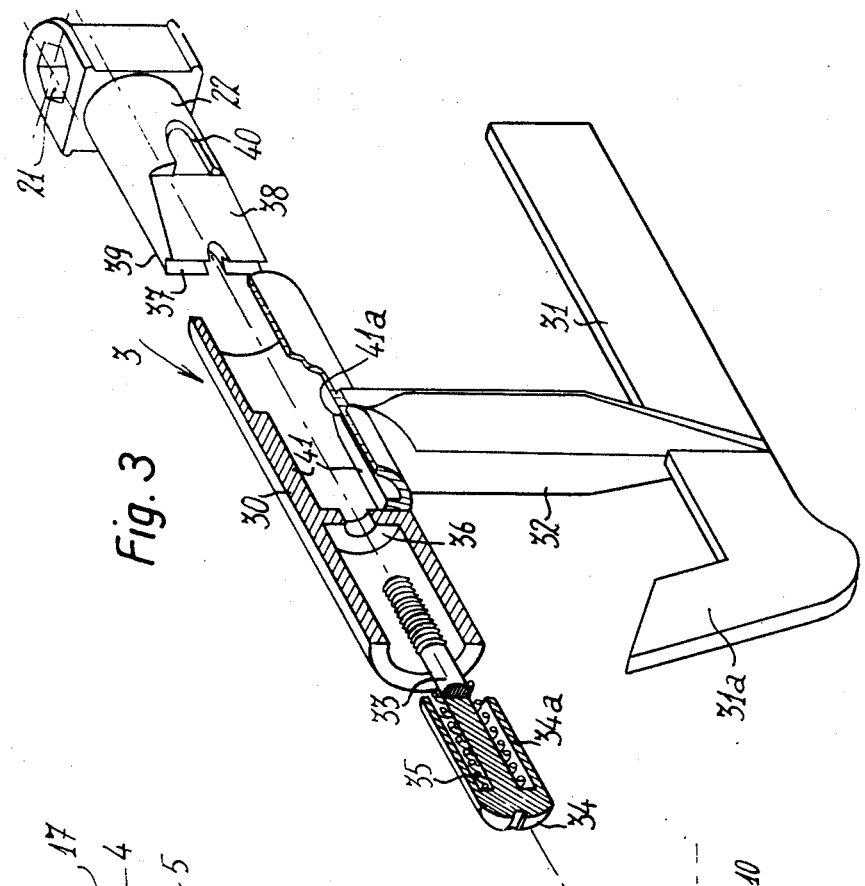
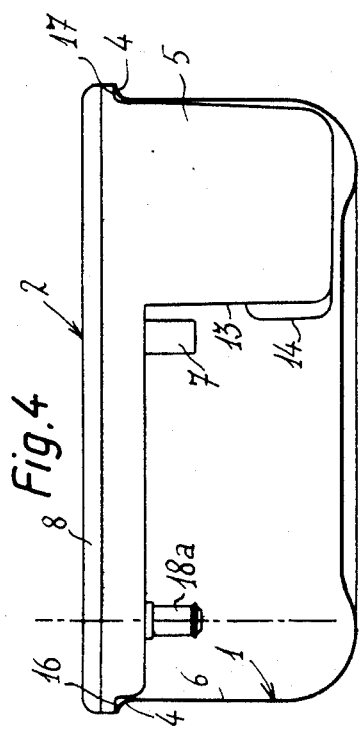
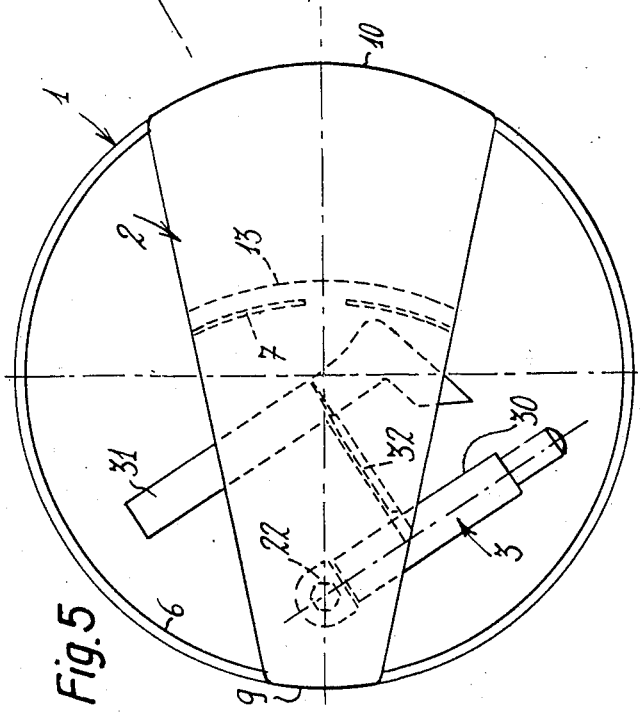

DOMESTIC ELECTRIC ICE-CREAM FREEZER

This invention relates to a domestic electric ice-cream freezer for preparing sherbets, ice creams, parfaits and the like without any need for supervision by the user. Setting of these culinary preparations is initiated by placing the ice-cream freezer either in the evaporator compartment of a refrigerator or in a cold-storage unit or in a deep-freeze unit.

In some known types of ice-cream freezers which are intended to be employed in a refrigerated enclosure, the drive unit which is placed on the side of the vessel is attached to a lid containing the transmission members which are connected to the mixing paddles. The mixing vessel is completely covered by the lid and is usually round or oval. Said lid is held in position on the vessel either by tight-fitting engagement on this latter or by means of toggle-type closure systems or by means of stirrup-bolts.

The defect of this type of ice-cream freezer in which provision is made for a reduction-gear motor attached to a lid lies in the fact that the ice-cream preparation is not accessible during the mixing operation, that the cold atmosphere of the cooling chamber does not produce action on the vessel walls and cannot reach the actual surface of the mix, and that the freezer takes up as much space when not in use as it does during operation.

In a certain number of other appliances of this type, the reduction-gear motor is housed in the central portion of an annular vessel.

The major disadvantages of these appliances lie in the relatively high cost price of the annular vessel, in the difficulty involved in removal from the mold and in the considerable difficulty involved in the use of a special spoon for the purpose of forming ice-cream balls by reason of the small size of the appliances.

The aim of the present invention is to overcome the disadvantages attached to the designs mentioned in the foregoing by providing an ice-cream freezer which is very easy both to manufacture and to use and which has in particular a very small overall size when not in operation.

The domestic electric ice-cream freezer which is contemplated by the invention and is intended to be used in a refrigerated enclosure comprises in known manner a substantially cylindrical vessel and a reduction-gear motor unit for driving at least one mixing paddle which is removably secured to the vessel.

In accordance with the invention, the ice-cream freezer is distinguished by the fact that the reduction-gear motor unit rests on a portion of the edge of the vessel in the operating position, that portion of said unit which contains the motor being located outside the vessel and applied against the external face of the side wall of the vessel, that portion which contains the reduction-gear system being adapted to extend above the vessel and provided with a projecting tongue which bears freely against the internal face of the wall aforementioned, and that the two opposite ends of the reduction-gear motor unit comprise two coaxial cylindrical portions whose radius corresponds substantially to the radius of the vessel and that the height of the reduction-gear motor unit corresponds substantially to the depth of the vessel.

It has been found that the method adopted for mounting the reduction-gear motor unit of the ice-cream freezer in accordance with the invention was effective and that said unit could readily be removed by the user.

The static stability of the reduction-gear motor unit is ensured by the application of that portion of said unit which is adjacent to the motor on the external face of the side wall of the vessel. Moreover, dynamic stability of said unit is ensured by virtue of the wedge action produced at the level of those portions of the unit which are applied against the external and internal faces of the vessel as a result of the reaction torques produced by the rotation of the paddle in the ice-cream preparation.

Moreover, by virtue of its two cylindrical extremities and of its height which is substantially equal to the depth of the vessel, the reduction-gear motor unit can be placed within the vessel and this makes it possible to reduce the overall size of the ice-cream freezer and thus to facilitate storage of this latter.

In a preferred embodiment of the invention, the two cylindrical portions are joined to each other by means of two flat faces which diverge towards the extremity of the unit which is adjacent to the motor.

The vessel is thus covered by the least bulky portion of the reduction-gear motor unit, thereby permitting ready access to the ice-cream preparation and facilitating heat exchanges with the refrigerated enclosure.

In accordance with another preferred feature, the two cylindrical portions have a shouldered projection in the vicinity of the top face of the reduction-gear motor unit.

As a consequence, when the reduction-gear motor unit is introduced into the vessel for storing the freezer, the unit rests on the edge of the vessel by means of said shouldered projections.

In an alternative embodiment, the ice-cream freezer comprises a mixing-paddle system which can be raised when the ice-cream mix attains the requisite degree of hardness and which has two locking positions having a relative angular spacing of 90°. Said freezer is distinguished by the fact that the locking means are applied between the two positions aforementioned against two sliding faces which diverge towards the axis of the vessel, the angle made between said two sliding faces being such that the mixing paddle cannot come into contact with the vessel wall between the two locking positions aforementioned.

When the locking means are displaced in sliding motion towards the axis of the vessel along said sliding faces, the movement of rotation of the paddle about an axis at right angles to the axis of the vessel is accompanied by a movement of translation of the paddle along the axis aforesaid towards the center of the vessel. This movement of translation has the precise object of preventing the paddle from coming into contact with the vessel wall. Furthermore, by virtue of this movement of translation, the mixing system can be housed within the vessel in the raised position without thereby entailing the need to remove the reduction-gear motor unit.

Further properties and advantages of the invention will become apparent from the following description, reference being made to the accompanying drawings which are given by way of example without any limitation being implied, and in which:

FIG. 3 is an exploded view in perspective and in partial cross-section showing the mixing system in the operation position;

FIG. 4 is a diagrammatic longitudinal sectional view of the freezer without the mixing paddle, as shown in the storage position;

FIG. 5 is a diagrammatic top view of the freezer in the storage position.

Figure 1:
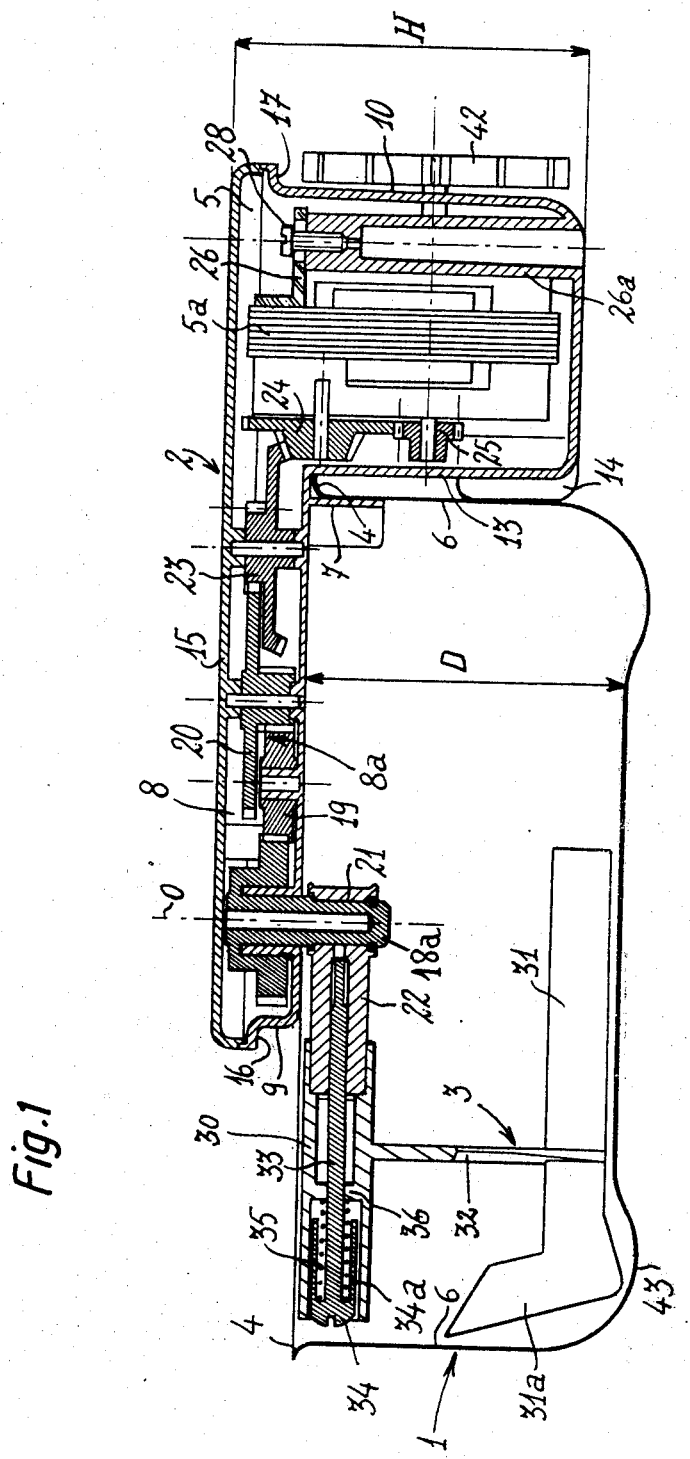
FIG. 1 is a longitudinal sectional view of an ice-cream freezer according to the invention in the operating position.
Figure 2:
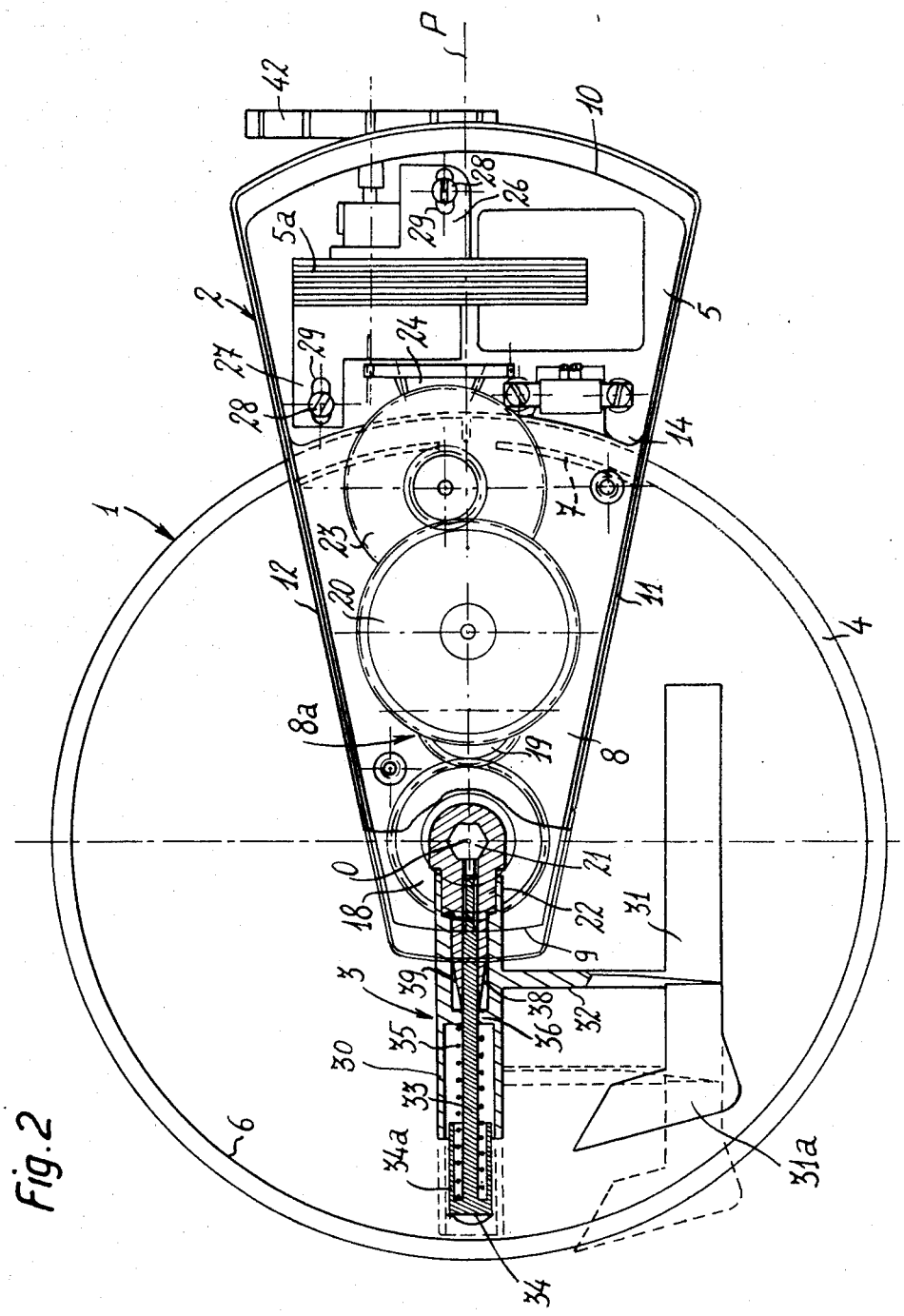
FIG. 2 is a top view of the freezer after removal of the lid, the mixing system being shown in cross-section and in the raised position.

In the embodiments shown in FIGS. 1 and 2, it is apparent that the ice-cream freezer in accordance with the invention consists mainly of a substantially cylindrical vessel 1 and a reduction-gear motor unit 2 for driving a stirring and mixing system 3.

It is apparent that, when the freezer is in the operating position, the reduction-gear motor unit 2 is placed astride one portion of the edge 4 of the vessel, the portion 5 of said unit which contains the motor 5a being located outside the vessel 1 and that portion 8 which contains the reduction-gear system 8a being so arranged as to extend above the vessel 1 over a distance which is slightly greater than the radius of said vessel. The portion 5 of the reduction-gear motor unit is applied against the external face of the side wall 6 of the vessel 1 and a projecting tongue 7 which is secured to the portion 8 of the unit is mounted so as to bear freely against the internal face of the wall 6 aforesaid.

It is also apparent that the reduction-gear motor unit 2 has a plane of symmetry P which coincides with a diametral plane of the vessel 1 (as shown in FIG. 2). The two opposite ends of the reduction-gear motor unit 2 have two cylindrical and coaxial portions 9 and 10, the radius of which corresponds substantially to that of the vessel 1. The maximum height H of the reduction-gear motor unit at the level of the portion 5 which contains the motor 5a corresponds substantially to the depth D of the vessel 1. Furthermore, the length of the reduction-gear motor unit 2 as measured between the cylindrical portion 9 and 10 corresponds to the diameter of the vessel 1.

It is also apparent from FIG. 2 that the two cylindrical portions 9 and 10 located at the opposite ends of the reduction-gear motor unit 2 are joined to each other by means of two flat faces 11 and 12 which are symmetrical with respect to the diametral plane P of the vessel 1 and diverge towards the cylindrical portion 10 which is adjacent to the motor 5a. The reduction-gear motor unit 2 thus covers only a small angular sector above the vessel 1.

In the embodiment of FIG. 2, the angular sector aforesaid corresponds to an angle which is centered on the axis O of the vessel 1 and is approximately equal to 45°.

In the embodiment of FIGS. 1 and 2, the rim 4 of the vessel 1 is curved outwards. By virtue of this arrangement, a space having a width corresponding to that of the rim 4 of the vessel 1 is provided between the tongue 7 which bears freely against the internal face of the vessel 1 and the motor-unit wall 13 which is adjacent to the external face of said vessel 1. By reason of said space, the lower portion of the motor-unit wall 13 is provided with a boss 14 applied against the external face of the vessel 1, the thickness of said boss 14 being substantially equal to the width of the space aforesaid.

Moreover, the reduction-gear motor unit 2 is provided on the two cylindrical portions 9 and 10 and in the vicinity of the flat top face 15 of the unit 2 with shouldered portions 16 and 17, the profile of which is complementary to that of the edge 4 of the vessel 1 (as shown in FIG. 1).

It is apparent from FIGS. 1 and 2 that the reduction-gear system 8a of the reduction-gear motor unit 2 comprises a set of spur-tooth pinions 18, 19, 20, the axes of which are located in the plane of symmetry P of the reduction-gear motor unit 2.

The pinion 18 which is located at the end corresponding to the cylindrical portion 9 rotates about an axis which coincides with the axis 0 of the vessel 1 when the reduction-gear motor unit 2 is in the operating position as indicated in FIGS. 1 and 2.

Said pinion 18 is extended by a shaft 18a having an extremity of hexagonal cross-section which is engaged in a complementary bore 21 formed in the arm 22 which is rigidly fixed to the mixing system 3.

The set of spur-tooth pinions 18, 19, 20 engages with a pinion 23 having a set of spur-teeth and a set of bevel-teeth, said pinion 23 being in turn disposed in meshing engagement with a spur and bevel-tooth pinion 24 and this latter being connected to the pinion 25 which is keyed on the shaft of the motor 5a.

The motor 5a is fixed on two columns such as the column 26a of FIG. 1 which are integral with the wall 10, 13 surrounding the reduction-gear motor unit 2 by means of brackets 26 and 27 and of screws 28. The distance between the axes of the set of pinions 18, 19, 20 and 23 and the axes of the set of pinions 24 and 25 can be adjusted by displacing the motor 5a, this being achieved by means of the elongated slots 29 formed in the brackets 26 and 27.

It is consequently apparent that the reduction-gear motor unit 2 is so arranged that the portion 8 containing the reduction-gear system 8a extends over only a small area of the vessel 1, the most bulky and heaviest portion being located outside the vessel 1.

In FIGS. 1, 2 and 3, the mixing system 3 which is rigidly fixed to the shaft 18a of the pinion 18 comprises a tubular member 30 engaged on the arm 22 which is detachably secured to the shaft 18a. The tubular member 30 is rigidly fixed to the mixing paddle 31 by means of a paddle-shaft 32. Said tubular member 30 is traversed by a cross-pin 33, one extremity of which is threaded whilst the other extremity has a head 34 extended by a sleeve 34a. A compression spring 35 is applied beneath the head 34 against the transverse partition-wall 36 of the tubular member 30. Said spring 35 consequently tends to thrust the member 30 towards the axis 0 of the vessel 1. The threaded end of the cross-pin 33 is screwed into the arm 22 which is secured to the shaft 18a. There is formed at the free end of said arm 22 a V-section groove 37 which is adjacent to two symmetrical sliding faces 38 and 39 which diverge towards the axis 0 of the vessel 1, each sliding face being provided with an extension in the form of a recess 40 (as shown in FIG. 3).

The tubular member 30 is additionally provided in the internal portion located between the partition-wall 36 and the end remote from the spring 35 with two bosses 41 which extend along the axis of the member 30 and are disposed diametrically with respect to said axis. The extremities of said bosses 41 are each provided with a point 41a which is intended to penetrate into the V-section groove 37 of the extremity of the arm 22.

It is therefore apparent that, when the mixing unit 3 is assembled by screwing the cross-pin 33 into the arm 22, the member 30 is capable of assuming two locking positions.

In the operating position, the mixing unit 3 is located in the plane of symmetry P of the reduction-gear motor unit 2 as shown in FIG. 1. In this position, the points 41a of the bosses 41 are engaged in the V-section groove 37 formed in the extremity of the arm 22.

In the position shown in FIG. 2 in which the paddle is raised, the mixing unit 3 is placed at an angle of 90° with respect to the previous position. The sides of the bosses 41 are engaged within the recesses 40 located in the line of extension of the sliding faces 38 and 39.

In accordance with a characteristic feature of this invention, the two sliding faces 38 and 39 are inclined to each other at an angle which is divergent towards the axis 0 of the vessel 1 so that the tip of the paddle 31 cannot come into contact with the internal wall 6 of the vessel 1 between the two locking positions aforesaid.

It can be seen from FIG. 2 that, when no provision is made for said sliding faces 38 and 39, the paddle 31 would assume as it returns upwards the position shown in dashed lines which is incompatible with the diameter of the vessel 1.

In order to make use of the ice-cream freezer in accordance with the invention, the following operations are performed:

The reduction-gear motor unit 2 is first placed in position on the edge 4 of the vessel 1 by engaging said unit in the space formed between the tongue 7 and the adjacent wall 13 of the portion 5 of the unit containing the motor 5a. The mixing system 3 is put in the operating position, that is to say in the vertical position with respect to the bottom of the vessel 1.

The ice-cream mix can then be introduced in the vessel 1, the mixing system 3 can be driven in rotation and the freezer can then be placed in a refrigerated enclosure.

The static stability of the reduction-gear motor unit 2 is ensured on the one hand by the fact that the boss 14 formed on that portion 5 of the unit which is adjacent to the motor 5a is applied against the external face of the lateral wall 6 of the vessel 1 and on the other hand by the fact that the tongue 7 is applied against the internal face of said wall 6. The reduction-gear motor unit 2 is thus incapable of swinging back in spite of the substantial weight of the motor 5a relatively to the portion 8 which contains the reduction-gear system 8a.

Dynamic stability of the reduction-gear motor unit 2 is ensured by virtue of the wedge action produced between the tongue 7 and the boss 14 applied against the lateral wall 6 of the vessel 1 and resulting from the reaction torques produced by rotational motion of the paddle 31 in the ice-cream mix.

Moreover, the viscosity of the mix contained in the vessel increases during cooling. The mixing effort thus increases and tends to cause pivotal motion of the tubular member 30 of the mixing system 3 about its axis. When the axial component of said effort which is transmitted by the bosses 41 to the sides of the V-section groove 37 of the arm 22 exceeds the restoring force of the spring 35, the tubular member 30 moves to a slight extent towards the wall 6 of the vessel 1 and the bosses 41 disengage from the V-section groove 37 while initiating a movement of rotation about the axis of the member 30. As soon as the points 41a of the bosses 41 have passed beyond the edges of the V-section groove 37, the spring 35 thrusts back the tubular member 30 towards the axis 0 of the vessel 1. Accordingly, the sides of the bosses 41 bear on the sliding faces 38 and 39 and then engage in the recesses 40. The paddle 31 is then placed parallel to the bottom of the vessel 1 as shown in FIG. 2, that is to say outside the ice-cream mix contained in the vessel 1.

It will be noted that the axial displacement of the tubular member 30 takes place rapidly between the two locking positions of the mixing system 3 by virtue of the action produced by the spring 35 and is of sufficient magnitude to ensure that the extremity of the paddle 31 remains inscribed within the vessel 1.

When the operation is completed and the ice-cream mix is withdrawn from the vessel 1, the reduction-gear motor unit 2 can be disengaged from the edge 4 of the vessel 1 and said unit can then be placed inside said vessel as shown in FIGS. 4 and 5. In this arrangement, the reduction-gear motor unit 2 is supported on the edge 4 of the vessel 1 by the shouldered portions 16 and 17 formed on the cylindrical portions 9 and 10. It can be understood that this arrangement is possible by virtue of the fact that the length of the reduction-gear motor unit 2 is substantially equal to the diameter of the vessel 1 and by virtue of the fact that the height H of the portion 5 comprising the motor 5a corresponds substantially to the depth D of the vessel 1.

As also shown in FIG. 5, it serves no useful purpose to remove the mixing system 3 in order to house the reduction-gear motor unit 2 inside the vessel 1. It is in fact only necessary to ensure that the paddle 31 is in the raised position and to rotate the arm 22 about its axis in order to inscribe the mixing system 3 between the wall 6 of the vessel 1 and the tongue 7 of the reduction-gear motor unit 2.

In the arrangement shown in FIGS. 4 and 5, the space occupied by the ice-cream freezer in accordance with the invention thus corresponds substantially to the overall size of the vessel 1.

The invention is clearly not limited to the forms of construction described in the foregoing and a large number of modifications can accordingly be made in these latter without thereby departing either from the scope or the spirit of the invention.

From this it follows that the reduction-gear motor unit 2 can also be fitted with a removable fan mounted on the shaft-end of the motor 5a (see FIGS. 1 and 2). The fan 42 has the effect of agitating the air of the refrigerated enclosure and thus of accelerating heat exchanges between this latter and the ice-cream preparation.

Moreover, the bottom of the vessel 1 can be provided on its periphery with an outwardly die-stamped bulge 43 for reducing heat exchanges between said bottom and the surface of the refrigerated enclosure on which the freezer is intended to be placed (see FIG. 1).

In fact, in the case of a vessel having a flat bottom, the heat-exchange surface is too large in comparison with the volume of the mixture to be frozen. Under these conditions, the bottom of the vessel is frozen more rapidly than the remainder of the mix and the paddle 31 moves upwards prior to completion of the freezing process. This considerable disadvantage is avoided by means of the peripheral bulge 43.

It is also apparent from FIG. 1 that the mixing paddle 31 is provided at the end adjacent to the lateral wall of the vessel with a raised nose 31a which is intended to set up a bow wave in the vicinity of the vessel wall and thus to prevent the formation of a ring of ice crystals. Moreover, the paddle-shaft 32 which connects the tubular member 30 to the paddle 31 has a knife-edge profile in order to prevent the formation of undesirable streaks at the surface of the ice (see FIGS. 1 and 4).

We claim:

1. A domestic electric ice-cream freezer for use in a refrigerated enclosure, comprising a vessel having a cylindrical side wall and a reduction-gear motor unit having a shaft adapted to drive a paddle system, the reduction-gear motor unit resting on only a portion of the edge of the cylindrical side wall of the vessel in the operating position, the portion of said unit which contains the motor being located outside the vessel and being applied against the external face of the cylindrical side wall of said vessel, the portion of said unit containing the reduction-gearing extending partly above the vessel and having a projecting tongue bearing freely against the internal face of said side wall, the reduction-gear motor unit having two opposite ends that comprise two coaxial cylindrical portions whose radius corresponds substantially to the radius of the vessel, each of said two coaxial cylindrical portions having a shouldered projection in the vicinity of the top face of the reduction-gear motor unit, the height of said reduction-gear motor unit being substantially the depth of said vessel, and said reduction-gear motor unit being therefore arranged to fit inside the vessel when not in use, with the shouldered projections of the said cylindrical portions resting on the edge of the vessel.

2. An ice-cream freezer according to claim 1, wherein the two cylindrical portions are joined to each other by means of two flat faces which diverge toward the end of the unit which is adjacent to the motor.

3. An ice-cream freezer according to claim 1, in combination with a paddle system that comprises a tubular member engaged on an arm detachably secured to the shaft of the reduction-gear motor unit, said tubular member being fixed to a mixing paddle, a spring urging said tubular member toward said arm, said tubular member comprising further two bosses at its end adjacent the arm, said bosses penetrating into a groove on the free end of said arm, said free end of said arm having two symmetrical sliding faces which diverge from said groove toward the end of the arm secured to the shaft of the reduction-gear motor unit, each sliding face having an extension in the form of a recess, said groove and said recesses cooperating with the bosses of the tubular member to determine two locking positions spaced at an angular interval of 90° of said tubular member with respect to said arm and the angle between the said two sliding faces being such that the mixing paddle fixed to the tubular arm cannot come into contact with the vessel between said two locking positions.

4. An ice-cream freezer according to claim 1, wherein the base of the vessel has a peripheral outwardly die-stamped bulge for reducing heat exchange between said base and the surface of the refrigerated enclosure on which the ice-cream freezer is to be placed.

* * * * *